United States Patent
Suzuki et al.

(10) Patent No.: US 10,035,707 B2
(45) Date of Patent: Jul. 31, 2018

(54) ARTIFICIAL GRAPHITE MATERIAL FOR NEGATIVE ELECTRODE OF LITHIUM ION SECONDARY BATTERY, AND METHOD FOR PRODUCING SAME

(71) Applicant: JXTG Nippon Oil & Energy Corporation, Tokyo (JP)

(72) Inventors: Takashi Suzuki, Tokyo (JP); Masaki Fujii, Tokyo (JP); Takashi Maeda, Tokyo (JP); Hiroshi Kawachi, Tokyo (JP)

(73) Assignee: JXTG Nippon Oil & Energy Corporation (JP)

( * ) Notice: Subject to any disclaimer, the term of this patent is extended or adjusted under 35 U.S.C. 154(b) by 77 days.

(21) Appl. No.: 15/123,428

(22) PCT Filed: Feb. 26, 2015

(86) PCT No.: PCT/JP2015/055662
§ 371 (c)(1),
(2) Date: Sep. 2, 2016

(87) PCT Pub. No.: WO2015/133366
PCT Pub. Date: Sep. 11, 2015

(65) Prior Publication Data
US 2017/0057825 A1 Mar. 2, 2017

(30) Foreign Application Priority Data
Mar. 4, 2014 (JP) .................................. 2014-041837

(51) Int. Cl.
*C01B 32/20* (2017.01)
*H01M 4/00* (2006.01)
(Continued)

(52) U.S. Cl.
CPC .............. *C01B 31/04* (2013.01); *C01B 32/20* (2017.08); *C10B 57/045* (2013.01);
(Continued)

(58) Field of Classification Search
CPC ............................................. C01B 31/00–32/00
See application file for complete search history.

(56) References Cited

U.S. PATENT DOCUMENTS

2007/0148548 A1 6/2007 Suzuki et al.
2009/0242849 A1 10/2009 Sudoh et al.
(Continued)

FOREIGN PATENT DOCUMENTS

EP 2479823 A1 7/2012
EP 3088491 A1 11/2016
(Continued)

OTHER PUBLICATIONS

Extended European Search Report for Application No. EP15758852.6 dated Aug. 21, 2017.
(Continued)

*Primary Examiner* — Colleen P Dunn
(74) *Attorney, Agent, or Firm* — Lerner, David, Littenberg, Krumholz & Mentlik, LLP

(57) ABSTRACT

The present invention relates to an artificial graphite material for a negative electrode of a lithium ion secondary battery which shows smaller deteriorations of the capacity of charging and discharging cycles and which has a reduced internal resistance and a high output characteristic. It is an artificial graphite material for a lithium ion secondary battery negative electrode, wherein the size L(112) of a crystallite in the c-axis direction is 5 to 25 nm; the ratio (ID/IG) of the intensities of peaks is 0.05 to 0.2; and the relative absorption intensity ratio (I4.8 K/I280 K) is 5.0 to 12.0.

4 Claims, 1 Drawing Sheet

(51) Int. Cl.
*C01B 31/04* (2006.01)
*H01M 4/587* (2010.01)
*C10B 57/04* (2006.01)
*H01M 4/04* (2006.01)
*H01M 10/0525* (2010.01)
*H01M 10/052* (2010.01)
*H01M 4/02* (2006.01)

(52) U.S. Cl.
CPC ......... *H01M 4/0471* (2013.01); *H01M 4/587* (2013.01); *H01M 10/0525* (2013.01); *C01P 2002/77* (2013.01); *C01P 2002/82* (2013.01); *C01P 2002/86* (2013.01); *C01P 2002/90* (2013.01); *C01P 2006/40* (2013.01); *H01M 10/052* (2013.01); *H01M 2004/027* (2013.01)

(56) References Cited

U.S. PATENT DOCUMENTS

| | | | |
|---|---|---|---|
| 2010/0209331 A1 | 8/2010 | Sakamoto et al. | |
| 2010/0221543 A1 | 9/2010 | Sudoh et al. | |
| 2013/0273432 A1* | 10/2013 | Ishimaru | H01M 4/133 429/231.8 |
| 2014/0079622 A1* | 3/2014 | Suzuki | H01M 4/587 423/448 |
| 2016/0319199 A1* | 11/2016 | Kawachi | C10B 57/045 |

FOREIGN PATENT DOCUMENTS

| | | |
|---|---|---|
| JP | 11054123 | 2/1999 |
| JP | 2001233609 A | 8/2001 |
| JP | 2007153661 A | 6/2007 |
| WO | 2006003858 A1 | 1/2006 |
| WO | 2009044789 A1 | 4/2009 |
| WO | 2012081439 A1 | 6/2012 |
| WO | 2015098754 A1 | 7/2015 |

OTHER PUBLICATIONS

Ariyoshi, et al., "Cycleability on the LTO/LAMO Cells for 12 V "Lead-free" Accumulators", The 76th Meeting of the Electrochemical Society of Japan, Abstracts, 1P29 (Mar. 26, 2009) (with its partial English translation).

Ariyoshi, et al., "Twelve-Volt "Lead-Free" Accumulators consisting of LTO and LAMO: High and Low Temperature Examinations", The 48th Battery Symposium in Japan, Abstracts, 1A11 (Nov. 13, 2007) (with its partial English translation).

Katagiri, "Raman Spectroscopy of Graphite and Carbon Materials and Its Recent Application", Tanso, the Journal of the Carbon Society of Japan, No. 175, pp. 304-313, 1996 (with its partial English translation).

Katagiri, et al., "Characterization of Graphite Powders for Lithium Secondary Battery by Laser Raman Spectroscopy", The 35th Battery Symposium in Japan, Abstracts, 2B06 (Nov. 15, 1994) (with its partial English translation).

Matsubara, et al., "Electron Spin Resonance of Natural Graphite Powder Different in Grinding Method and Diameter", Tanso, the Journal of the Carbon Society of Japan, No. 175, pp. 249-256, 1996 (with its partial English translation).

Mizushima, "Electron Spin Resonance in Carbons (I)", Tanso, the Journal of the Carbon Society of Japan, No. 47, pp. 30-34, 1966 (with its partial English translation).

Mizushima, "Electron Spin Resonance in Carbons (II)", Tanso, the Journal of the Carbon Society of Japan, No. 50, pp. 20-25, 1967 (with its partial English translation).

Negative electrode carbon material for lithium ion secondary battery (Richiumu Ion Niji Denchi Notameno Fukyokuyou Tanso Zairyo), pp. 3 to 4, published by Realize Riko Center, K.K., Oct. 20, 1996 (with its partial English translation).

* cited by examiner

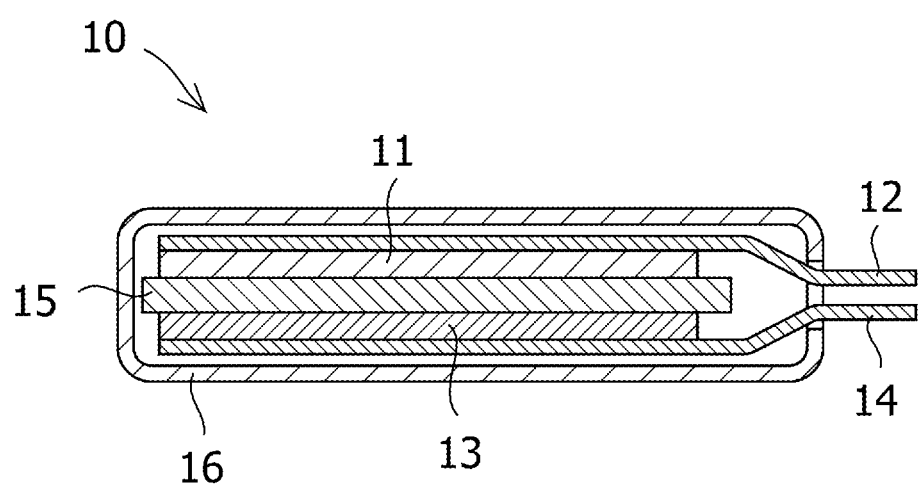

1

ARTIFICIAL GRAPHITE MATERIAL FOR NEGATIVE ELECTRODE OF LITHIUM ION SECONDARY BATTERY, AND METHOD FOR PRODUCING SAME

CROSS-REFERENCE TO RELATED APPLICATIONS

The present application is a national phase entry under 35 U.S.C. § 371 of International Application No. PCT/JP2015/055662 filed Feb. 26, 2015, published in Japanese, which claims priority from Japanese Patent Application No. 2014-041837 filed Mar. 4, 2014, all of which are hereby incorporated herein by reference.

BACKGROUND OF THE INVENTION

Technical Field

The present invention relates to a graphite material used for the negative electrode material of a lithium ion secondary battery.

Background Art

A lithium ion secondary battery is light in weight and has high input and output performances as compared with those of nickel cadmium batteries, nickel hydrogen batteries and lead batteries which are conventional secondary batteries. That is the reason why the lithium ion secondary battery is put into practical use as an electric power source for electric automobiles and hybrid vehicles. Usually, a lithium ion secondary battery is constituted by opposing a positive electrode containing lithium which makes reversible intercalation possible to a negative electrode material including a graphite material via a nonaqueous electrolyte. Accordingly, the lithium ion secondary battery is prepared in a discharged state and is put into a dischargeable state by charging. In the following, for a discussion purpose, we will use an example in which lithium cobalt oxide ($LiCoO_2$) is used for the positive electrode, a carbon material for the negative electrode, and a nonaqueous electrolyte containing a lithium salt for the electrolyte, and discuss charge and discharge reactions of such lithium ion secondary batteries.

First, when charging is carried out for the first cycle, lithium present in the positive electrode is released into the electrolyte (right arrow direction in equation 1 below), and the potential of the positive electrode potential becomes nobler (higher). At the negative electrode, lithium discharged from the positive electrode is occluded into the carbon material (right arrow direction in equation 2 below), and the potential of the negative electrode potential becomes baser (lower). Usually, when the difference between the potentials of the positive and negative electrodes, or the battery voltage, reaches a prescribed value, charging is finished. This value is called the final charging voltage.

Then, when discharged, lithium occluded in the negative electrode is released (left arrow direction in equation 2 below), and the negative electrode potential becomes nobler. Lithium is occluded again in the positive electrode (left arrow direction in equation 1 below), and the positive electrode potential becomes baser. As is the case with charging, discharging also finishes when the difference between the positive and negative electrode potentials, or the battery voltage, reaches a prescribed value. The value thereof is called the final discharging voltage.

The whole reaction equations of charging and discharging described above are shown by equation 3 below. During and after the second cycle subsequent thereto, lithium moves back and forth between the positive and negative electrodes, whereby the charge and discharge reactions (charging and discharging cycle) proceed.

$$LiCoO_2 \leftrightarrow Li_{1-x}CoO_2 + xLi^+ + e^- \quad \text{(Equation 1)}$$

$$C + xLi^+ + e^- \leftrightarrow Li_xC \quad \text{(Equation 2)}$$

$$LiCoO_2 + C \leftrightarrow Li_{1-x}CoO_2 + Li_xC \quad \text{(Equation 3)}$$

The carbon material used for the negative electrode in the lithium ion secondary battery is usually divided roughly into a graphite based carbon material and an amorphous carbon material. The graphite based carbon material has the advantage that the energy density per unit area is higher than that of the amorphous carbon material. Accordingly, in the lithium ion secondary battery for mobile phones and laptop personal computers which has to have a smaller size and a larger capacity, the graphite based carbon material is usually used for the negative electrode material. Graphite has a structure in which hexagonal reticulated plains made of carbon atoms are regularly laminated, and the insertion or release reaction of lithium ions proceeds at the edge part of the crystallites when charging or discharging.

As described above, the lithium ion secondary battery has actively been investigated in recent years as an electric storage device for automobiles, industrial uses, power supply infrastructures, and the like. When it is used for such applications, much higher reliability is required compared with applications for mobile phones and laptop personal computers. In this regard, the reliability is a characteristic relating to the life, and it relates to the characteristics that the charge and discharge capacity and the internal resistance do not change (less liable to deteriorate) even if charging and discharging cycles are repeated, even if the battery is stored as charged at the nominal voltage, or even if the battery keeps charging at a fixed voltage (subjected to floating charge).

On the other hand, it is generally known that the life characteristic of a lithium ion secondary battery which has so far been used for conventional mobile phones and laptop personal computers depends largely on the negative electrode material. The reason for this is that the charge and discharge efficiency is lower at the negative electrode and that it is impossible in principle to make the charge and discharge efficiency of the negative electrode reaction (equation 2) the same as that of the positive electrode reaction (equation 1). In this connection, the charge and discharge efficiency is the ratio of the amount of dischargeable electricity to the electricity consumed for charging. A reaction mechanism will be described in detail below to explain how the life characteristic deteriorates due to a lower charge and discharge efficiency of the negative electrode reaction.

During the charging step, lithium in the positive electrode is released (right arrow direction in the equation 1) and occluded in the negative electrode (right arrow direction in the equation 2) as described above, but the electricity consumed for charging is the same for reactions at the positive and negative electrodes. However, the charge and discharge efficiency is lower in the negative electrode, and thus discharging is finished while the amount of lithium released from the negative electrode is smaller than the amount of lithium occluded on the positive electrode side before charged during the subsequent discharging reaction (left arrow direction in the equation 1, left arrow direction in the equation 2). The reason therefor is that a part of the electric capacity consumed for charging at the negative electrode is used for side and competitive reactions, and that it is not used for the reaction of occluding lithium, that is, the reaction of occluding lithium to build up a dischargeable capacity.

The above charge and discharge reactions occur separately at the positive and negative electrodes, and as a result, the positive electrode potential staying in the final discharged state becomes nobler than the original potential before charging and discharging. On the other hand, the negative electrode potential also becomes nobler than the original potential before charging and discharging. This is due to that all lithium ions released during the charging step at the positive electrode are not occluded (do not go back) and that when the potential becomes nobler during the charging step, it becomes baser during the discharging step, and it becomes impossible for the potential to go back to the original positive electrode potential by a margin that corresponds to a difference in the charge and discharge efficiencies between the positive and negative electrodes, so that discharging finishes at a nobler potential than the original positive electrode potential. As described above, the discharging of the lithium ion secondary battery is completed when the battery voltage (or the difference between the positive electrode potential and the negative electrode potential) reaches a prescribed value (final discharging voltage). Accordingly, if the potential of the positive electrode becomes nobler at the final discharging point, the negative electrode potential becomes nobler as well.

As shown above, after the lithium ion secondary battery repeats charging and discharging cycles, the operating regions for the capacities of the positive and negative electrodes changes, and the capacity obtained in the prescribed voltage range (the range between the final discharging voltage and the final charging voltage) problematically deteriorates. Such reaction mechanism of capacity deterioration as described above has also been reported in academic meetings and the like (non-patent documents 1 and 2).

On the other hand, the reason why the charge and discharge efficiency is low at the negative electrode is that a part of the electricity for charging at the negative electrode is used, as described above, for side and competitive reactions, and that it is not used for reactions of lithium occlusion. These side and competitive reactions are attributable principally to decomposition of the electrolyte at the edge surfaces of the hexagonal reticulated plane laminate exposed on the particle surface of the graphite material.

Also, when side and competitive reactions take place at the negative electrode, reaction products thereof are solid matters which are insoluble in the electrolyte at normal temperatures (which form so-called passivation films). Accordingly, the surface of the graphite material in the negative electrode is covered with the reaction products as the charging and discharging cycles proceed, and the film grows thicker (a deposition is formed). The film of the reaction products acts as a resistive component in the reversible intercalation reaction of Li ions, and thus the growth of the film increases the internal resistance of the battery. In particular, the film tends to form and grow on the edge surfaces of the hexagonal reticulated plane laminate at the surface of the graphite material which edge surfaces become the gateway for Li ions, and thus the battery will have an enhanced internal resistance and a reduced apparent battery capacity obtained by the nominal electric current as the charging and discharging cycles proceed.

As shown above, the lithium ion secondary battery has a deteriorated capacity by repeating the charging and discharging cycles due to two causes: (1) a change in the working area of the capacities of the positive and negative electrodes because of side and competitive reactions at the negative electrode and (2) a continuous increase in the internal resistance of the battery as the charge and discharge cycles repeat. Accordingly, the graphite material of the negative electrode has to have a function of inhibiting side and competitive reactions in the negative electrode and controlling the growth of the film as the charging and discharging cycles progress.

As a graphite material of the negative electrode satisfying the above requirements, a material having a smaller percentage of edge surfaces has been proposed and used. In this connection, the percentage of edge surfaces is the ratio of the area of "edge surface present on the surface" to the surface area of the graphite material. As described above, the film tends to form and grow on the edge surfaces which are gateway of Li ions. The side and competitive reactions with which a passivation film is formed are the cause of reducing the charge and discharge efficiency at the negative electrode. Accordingly, if the percentage of the edge surfaces is smaller, the extent of the side and competitive reactions resulting in the formation of the passivation film on the graphite surface can be reduced.

On the other hand, the lithium ion secondary battery for automobiles, industrial uses, power supply infrastructures, and the like is required to have a reduced internal resistance as it is used more widely and spread as social infrastructure. In general, the amount of heat generated in the lithium ion secondary battery is determined by the values of current during charging and discharging and the internal resistance, and for uses in which charging and discharging with a large electric current are expected, if the internal resistance is lower, the amount of heat generated can be reduced. The amount of heat generated has to be reduced for the reasons: (1) if the time in which the battery generates heat is longer, it reaches a high temperature, and the life characteristic further deteriorates so as to make it difficult to secure high reliability, and (2) a part of the dischargeable energy stored in the battery and the charging energy which should be stored in the battery is turned into heat and released to the outside of the system, so that the charge and discharge efficiency reduces. In order to address the problem of reducing the amount of heat generation, the internal resistance has so far been reduced by increasing the capacity of the battery, that is, by increasing the size of a single cell, or increasing the number of single cells connected in parallel, so that the internal resistance is physically reduced. However, such a way of addressing the program has resulted in the cost of battery systems being higher than necessary in order to secure unnecessary (extra) capacity which is not used at all.

An example in which charging and discharging with a large electric current are expected in automobile uses includes acceleration and slowdown in speed. When the speed is accelerated from driving at a constant speed, the battery responds instantly to the stepping of an accelerator (the request of speed acceleration by the driver). The energy amount lost by way of heat generated should be smaller when the battery is discharged with a large electric current during such acceleration. On the other hand, when the speed is reduced from driving at a constant speed, the battery responds instantly to the brake operation (the request of speed reduction or stopping by the driver). The rate of energy lost by heat generation should be small even when the battery is charged with regenerative energy (large electric current) produced by braking during such braking operation. Also, for power supply infrastructures, the battery should be able to surely follow quick changes in power demand which is hard to predict; that is, the rate of energy lost by heat generation should be low even when the battery is charged or discharged with large electric currents.

In addition to such characteristics, the lithium ion secondary battery used for automobiles, industrial uses, power supply infrastructures, and the like is required as well to have, as discussed above, high reliability. It has been difficult to satisfy requirements of reduced internal resistance and increased reliability at the same time. The reason for this is that a graphite material having a smaller percentage of edge surfaces should be used for the negative electrode in order to secure high reliability, and on the other hand, a graphite material having a small percentage of edge surfaces is not suitable for achieving reduced internal resistance. As discussed above, the edge surfaces present on the surface of the graphite material is a gateway for lithium ions occluded or released during charging and discharging, and therefore when a graphite material having a smaller area of edge surfaces, that is, having smaller gateways, is used for the negative electrode, the battery would have increased internal resistance.

CITATION LIST

Patent Document

Patent document 1: JP H11-54123 A

Non-Patent Documents

Non-patent document 1: The 48th Battery Symposium in Japan, Abstracts, 1A11 (Nov. 13, 2007)
Non-patent document 2: The 76th Meeting of the Electrochemical Society of Japan, Abstracts, 1P29 (Mar. 26, 2009)
Non-patent document 3: The 35th Battery Symposium in Japan, Abstracts, 2606 (Nov. 15, 1994)
Non-patent document 4: *Tanso*, the Journal of the Carbon Society of Japan, No. 47, pp. 30-34, 1966
Non-patent document 5: *Tanso*, the Journal of the Carbon Society of Japan, No. 50, pp. 20-25, 1967
Non-patent document 6: *Tanso*, the Journal of the Carbon Society of Japan, No. 175 pp. 249-256, 1996
Non-patent document 7: *Tanso*, the Journal of the Carbon Society of Japan, No. 175, pp. 304-313, 1996
Non-patent document 8: "Negative electrode carbon material for lithium ion secondary battery (*Richiumu Ion Niji Denchi Notameno Fukyokuyou Tanso Zairyo*)," pp. 3 to 4, published by Realize *Riko* Center, K.K., Oct. 20, 1996

The present invention is to reduce the internal resistance of lithium ion secondary batteries which are required to have high reliability. That is, an object of the present invention is to provide a graphite material for the negative electrode of lithium ion secondary batteries whose capacity in the charging and discharging cycle does not deteriorate and which has reduced internal resistance. Further, an object of the present invention is to provide, according to the graphite material described above, a negative electrode material for lithium ion secondary batteries used for automobiles, industrial uses, and power storage infrastructures with which both high reliability and reduced internal resistance are achieved.

In order to solve the problems described above, the graphite material according to the present invention is an artificial graphite material for the negative electrode of a lithium ion secondary battery, wherein a size L(112) of a crystallite in a c-axis direction which is calculated from a (112) diffraction line measured by powder X-ray diffraction is 5 to 25 nm; in Raman spectral analysis using an argon ion laser beam having a wavelength of 5145 angstrom, a ratio (ID/IG) of an intensity (ID) of peak present in a wavelength region of 1360 $cm^{-1} \pm 100$ $cm^{-1}$ to an intensity (IG) of peak present in a wavelength region of 1580 $cm^{-1} \pm 100$ $cm^{-1}$ is 0.05 to 0.2; an absorption spectrum originating from carbon which appears in a range of 3200 to 3400 gauss (G) is found in electron spin resonance spectroscopy measured using X band, and a relative absorption intensity ratio (I4.8 K/I280 K) of an absorption intensity (I4.8 K) measured at a temperature of 4.8 K to an absorption intensity (I280 K) measured at a temperature of 280 K in the above absorption spectra is 5.0 to 12.0.

In another aspect, the present invention relates to a production process for the artificial graphite material for a negative electrode of a lithium ion secondary battery described above, comprising at least: a coking step in which an ingredient oil composition containing at least a light oil having a distillation end point of 380° C. or lower and a heavy oil having an initial boiling point of 200° C. or higher, an aromatic component of 50% by mass or more, a sulfur content of 0.5% by mass or less and a nitrogen content of 0.2% by mass or less is subjected to coking treatment by delayed coking; and a heat treatment step in which the composition is subjected to heat treatment after the coking step.

In still another aspect, the present invention relates to a negative electrode material for a lithium ion secondary battery containing at least the artificial graphite material for a negative electrode of a lithium ion secondary battery described above.

In a different aspect, the present invention relates to a lithium ion secondary battery prepared by using the negative electrode material for a lithium ion secondary battery described above.

The graphite material of the present invention makes it possible to provide a lithium ion secondary battery whose capacity does not easily deteriorate during repeated charging and discharging cycles and which has reduced internal resistance. The lithium ion secondary battery prepared by using the graphite material of the present invention for a negative electrode material makes it possible to reduce the internal resistance while high reliability is maintained as compared with a lithium ion secondary battery prepared by using a conventional graphite material. Accordingly, it can be used for industrial applications such as large-scale power storage systems and vehicles, to be specific, hybrid vehicles, plug-in hybrid vehicles and electric vehicles, and the like.

BRIEF DESCRIPTION OF DINGREDIENTINGS

FIG. 1 is a cross sectional view of a battery.

DESCRIPTION OF THE PREFERRED EMBODIMENTS

The present invention will be explained below in detail.
The graphite material of the present invention is characterized by the fact that side and competitive reactions at the negative electrode are inhibited and charging and discharging are possible with a large electric current (the resistance is low during charging and discharging and fast charging and discharging is possible). First, side and competitive reactions at the negative electrode are, as discussed above, principally decomposition reactions of the electrolytic solution. The decomposition reactions of the electrolytic solution proceed at the edge surfaces of hexagonal reticulated plains laminates exposed on the particle surface of the negative electrode, and therefore in order to inhibit the decomposition reactions of the electrolytic solution, the area of the edge surfaces exposed on the surface should be reduced. Also, in order to reduce the resistance during charging and discharging reactions (occluding and releasing reactions of Li ions), interaction concerning contact between the electrolyte and the edge surfaces should be stronger. In order to smoothly promote the intercalation reaction of lithium ions present in the electrolyte into the crystal of the graphite material (corresponding to charging) and the dissolution reaction of lithium ions occluded in the crystal of the graphite material into the electrolyte (corresponding to discharging) with low resistance, the molecules and polymers constituting the electrolyte should be able to come closer to the surface of the graphite material, particularly to the edges thereof (more easily adsorbed on the edge), so that the reaction resistance can be reduced. For this purpose, the density of localized electrons present at the edges is preferably higher. That is, the graphite material of the present invention is characterized by the fact that the edge surface area exposed at the particle surface is smaller and the density of localized electrons present at the edges is higher, and the use of such graphite material for the negative electrode of lithium ion secondary batteries makes it possible to reduce the internal resistance while maintaining good longevity properties.

Such graphite material as shown above has smaller edge surfaces exposed at the particle surface and a high density of localized electrons present at the edge surfaces. The lithium ion secondary batteries prepared by using the above graphite material inhibits the decomposition reactions of the electrolytic solution at the negative electrode, and thus a difference is smaller between the operating ranges of the positive and negative electrodes. Also, the density of localized electrons present at the edge surfaces is high, and thus the interaction between the molecules and polymers constituting the electrolyte is stronger to make it possible to reduce the resistance to reversible intercalation reactions of Li ions.

In the graphite material, the relative ratio of edge surfaces exposed at particle surfaces can usually be determined from the relative intensity ratio obtained from the Raman spectra of the graphite material, that are, the ratio (ID/IG) of intensity (ID) of a peak present in a wavelength region of 1360 cm$^{-1}$±100 cm$^{-1}$ to intensity (IG) of a peak present in a wavelength region of 1580 cm$^{-1}$±100 cm$^{-1}$ in Raman spectral analysis using an argon ion laser beam having a wavelength of 5145 angstrom (non-patent document 3).

Also, the density of localized electrons in the graphite material can be determined from the relative absorption intensity ratio (I4.8 K/I280 K) of absorption intensity (I4.8 K) measured at a temperature of 4.8 K to absorption intensity (I280 K) measured at a temperature of 280 K in an absorption spectra originating from carbon which appears in a range of 3200 to 3400 gauss (G) in electron spin resonance spectroscopy measured using the X band. Accordingly, it can be described, in other words, that the range of the relative intensity ratio (ID/IG) of Raman spectra and that of I4.8 K/I280 K which is the absorption intensity ratio of ESR (electron spin resonance) spectra delimited for the graphite material of the present invention are specifically ranges in which the area of the edge surfaces exposed at the particle surface is smaller and the density of localized electrons present at the edge surfaces is higher.

In this connection, the ESR measurement will be explained in the following. The ESR measurement is spectroscopic analysis in which transitions are observed between levels that are created when the unpaired electrons are placed in a magnetic field. When a magnetic field is applied on a material having unpaired electrons, the energy level of the material is divided into two levels by the Zeeman effect. The measurement is done by sweeping a magnetic field over the material under microware irradiation, and as the magnetic field applied is increased, ΔE which is a split interval of the energy levels increases. When the ΔE becomes equal to the energy of the microwave irradiated, resonance absorption is observed, and an ESR spectra are obtained by measuring the amount of energy absorbed. The ESR spectrum is obtained usually in the form of a primary differential spectrum which can be integrated once to obtain the absorption spectrum, and when it is integrated twice, the signal intensity is obtained. The size of the signal intensity is an index representing the density of unpaired electrons in the material.

In carbon materials, two kinds of unpaired electrons are present: localized electrons and conduction electrons. That is, in the ESR measurement of a carbon material, the sum of resonance absorptions of microwave by the above two kinds of unpaired electrons is observed in the form of the ESR spectrum. The signal intensity obtained by integrating twice the ESR spectrum thus obtained is an index representing the density of the unpaired electrons, totaling the densities of conduction and localized electrons. In this regard, conduction electrons in the carbon material are unpaired π electrons spontaneously appearing in relation to the number of rings constituting each hexagonal reticulated plains and their manner of bonding, and they can freely move in the hexagonal reticulated plains (non-patent documents 4 and 5).

On the other hand, localized electrons are unpaired electrons present at the edge surface of the hexagonal reticulated plains laminate, and they are immobile. Also, while the signal intensity of resonance absorption by conduction electrons does not have temperature dependency, the signal intensity of resonance absorption by unpaired electrons increases inversely proportional to T which is temperature during measurements. In the ESR measurement of a carbon material in a temperature range of, for example, 4.2 K≤T≤300 K, when the measurement is carried out while gradually lowering the temperature from 300 K, the temperature dependency of absorption intensity is very small up to the vicinity of 100 K, with an almost fixed value being obtained. It has theoretically been concluded from the above fact that conduction electrons are the cause of ESR absorption in a temperature range of 300 to 100 K (non-patent document 4). It is reported that in a temperature range of 100 K or less, the absorption of microwave by localized electrons begins to be observed in the vicinity of 50 K and that the signal intensity by localized electrons increases inversely proportional to T which is measurement temperature in a low temperature range of 50 K or lower according to the Curie's law (non-patent document 6).

It can be understood from the above that the ESR absorption intensity at a temperature of 280 K reflects principally the amount of spin of conduction electrons and that an ESR absorption intensity at a temperature of 4.8 K reflects principally the amount of spin of localized electrons. Accordingly, the ESR absorption intensity ratio (I4.8 K/I280 K) at the two measurement temperatures of 4.8 K and 280 K can be regarded as the ratio of the amount of localized electron spin to that of conduction electron spin, and according to the present invention, the spin density of localized electrons is considered as an index that can be determined quantitatively.

In the artificial graphite material of the present invention, the absorption spectrum originating from carbon which appears in a range of 3200 to 3400 gauss (G) is included in electron spin resonance spectroscopy measured using the X band, and the relative absorption intensity ratio (I4.8 K/I280 K) of the absorption intensity measured at a temperature of 4.8 K (I4.8 K) to the absorption intensity measured at a temperature of 280 K (I280 K) in the above spectra is 5.0 to 12.0. In lithium ion secondary batteries prepared using a graphite material in which the relative absorption intensity ratio (I4.8 K/I280 K) is lower than 5.0, the characteristics of high reliability and long life can be secured, but the resistance to reversible intercalation reaction of lithium ions at the negative electrode is too high, and thus the internal resistance becomes unfavorably high from the beginning of the charging and discharging cycles. On the contrary, in lithium ion secondary batteries prepared using a graphite material in which the relative absorption intensity ratio is higher than 12.0, low internal resistance can be achieved at the beginning of the charging and discharging cycles, but the increasing internal resistance becomes unfavorably high as the charging and discharging cycles advance. It is considered that the graphite material in which the relative absorption intensity ratio is higher than 12.0 has a high density of localized electrons at edge surfaces exposed in the surface of the graphite material, so that the above localized electrons catalytically act in the decomposition reactions of the electrolytic solution.

As described above, the relative absorption intensity ratio (I4.8 K/I280 K) of an absorption intensity of spectrum measured at a temperature of 4.8 K (I4.8 K) to an absorption intensity of spectrum measured at a temperature of 280 K (I280 K) which are obtained by the ESR measurement of the graphite material is limited to 5.0 to 12.0. In a graphite material having the physical property falling in the above range, the amount of spin of localized electrons present at edges of the particle surface falls in a suitable range. Accordingly, for lithium ion secondary batteries prepared using the above graphite material for the negative electrode, high reliability (characteristic of long life) and reduced internal resistance can be both achieved. Also, the above range for the graphite material for the negative electrode provides that the above graphite material stays in the range of a negative electrode graphite material which can provide lithium ion secondary batteries with a specific effect of making it possible to reduce internal resistance while maintaining the characteristic of long life.

In the artificial graphite material of the present invention, the ratio (ID/IG) of the intensity (ID) of peak present in a wavelength region of 1360 cm$^{-1}$±100 cm$^{-1}$ to the intensity (IG) of peak present in a wavelength region of 1580 cm$^{-1}$±100 cm$^{-1}$ in Raman spectral analysis using an argon ion laser beam having a wavelength of 5145 angstroms is 0.05 to 0.2. A graphite material having the relation of ID/IG described above has been investigated for the negative electrode of lithium ion secondary batteries (non-patent document 7). Also, it is proposed that a graphite material having ID/IG of 0.3 or less is used as an ingredient material of the negative electrode material for lithium ion secondary batteries (patent document 1).

In lithium ion secondary batteries prepared using a graphite material having ID/IG exceeding 0.2, the speed of decomposition reactions of the electrolytic solution at the negative electrode is high, and a difference tends to occur between the operating ranges of the positive and negative electrodes. Accordingly, it is difficult to secure high reliability (characteristic of long life). On the other hand, a graphite material having ID/IG of less than 0.05 makes it impossible to achieve the relative absorption intensity ratio (I4.8 K/I280 K) of 5.0 to 12.0 as measured by ESR, and therefore it is not preferred.

In the artificial graphite material of the present invention, L(112) which is the size of crystallites calculated from a (112) diffraction line obtained by wide-angle X-ray diffraction of a graphite material falls in a range of 5.0 to 25 nm. A graphite material having L(112) of less than 5 nm is insufficient in the development of crystalline structure. Lithium ion secondary batteries prepared using the above graphite material have a decreased capacity, and therefore it is not preferred (non-patent document 8).

Also, the reason why 25 nm is set as an upper limit is that it is realistically difficult to obtain a graphite material having a size exceeding 25 nm. Accordingly, L(112) should be regulated to 5 to 25 nm because it should be clarified that the graphite material prescribed in the present invention is to have a crystallite size, or degree of graphitization, corresponding to that of a conventional graphite material used for the negative electrode of lithium ion secondary batteries.

Next, the production process for the artificial graphite material according to the present invention will be explained.

The process "in which an ingredient oil composition is subjected to coking treatment by delayed coking" is generally known as a process for producing coke which is an ingredient material of a graphite material. The present inventors have found that restricting the physical properties of ingredient oil compositions makes it possible to produce a graphite material prescribed in the first invention of the present application by making use of the above process.

In general, it is known as a production process of a graphite material that raw coke or calcined coke is crushed, classified and adjusted for particle sizes, and the coke is then carbonized and/or graphitized. In this connection, the raw coke is prepared by thermally decomposing an ingredient oil composition by means of a delayed coker. Also, the calcined coke means a material obtained by subjecting raw coke to heat treatment in an industrial furnace to remove moisture and volatile components and develop a crystalline structure.

The artificial graphite material of the present invention cannot be obtained by the above conventional production process, in which raw coke or calcined coke is merely crushed and classified, and then subjected to heat treatment. The present inventors have investigated a production process for a graphite material and found that upgrading the optical anisotropy of hexagonal reticulated plains laminated in a disorderly manner which laminates constitute raw coke or calcined coke to be crushed provides a graphite material (1) in which a lot of Sp$^3$ carbon which is different from Sp$^2$ carbon constituting hexagonal reticulated plains remain on the broken surfaces of particle surfaces newly produced by crushing, that is, at edge regions, and (2) in which the remaining Sp$^3$ carbon still remain with a high probability even after graphitization and the spin density of localized electrons present in such regions becomes high.

When the optical anisotropy of the hexagonal reticulated plains laminated in a disorderly manner which constitute raw coke or calcined coke to be crushed stays at a high level; that is, when the degree of parallelism among the laminated and neighboring hexagonal reticulated plains is high, the crushing energy on the hexagonal reticulated plains for cleaving tends to be dispersed. That is, since the resistance to the crushing energy is strong, differences increase among the irregular heights of broken surfaces after crushing, and unorganized carbon tends to develop in a certain direction. Such unorganized carbon thus produced have a higher probability of remaining chemically bonded to edge surfaces even after graphitization, and the spin density of localized electrons, which exist because carbon is unorganized, tends to be high. When the graphite material having such edge surface conditions is used as a negative electrode material, interaction between the localized electrons present at the edge surfaces and the molecules and polymers which constitute the electrolyte becomes stronger, and the resistance to charge and discharge reactions, or the resistance to the reversible intercalation reaction of lithium ions, reduces. As a result, lithium ion secondary batteries will have a reduced internal resistance.

On the other hand, when the hexagonal reticulated plains which constitute raw coke or calcined coke are laminated with low optical anisotropy ordering, that is, when the laminated hexagonal reticulated plains have a low degree of parallelism with neighbors and include curved areas or the like, the crushing energy of the hexagonal reticulated plains for cleaving is concentrated on such curved areas. Accordingly, differences decrease among the irregular heights of broken surfaces after crushing, and unorganized carbon tends not to develop in a certain direction. Such unorganized carbon thus produced has a lower probability of remaining chemically bonded to edge surfaces after graphitization, and the spin density of localized electrons present tends to be disadvantageously low. When the graphite material having such edge surface conditions is used as a negative electrode material, interaction between the localized electrons present at the edge surface and the molecules and polymers which constitute the electrolyte becomes weaker, and the resistance to charge and discharge reactions, or the resistance to the reversible intercalation reaction of lithium ions, increases. As a result, lithium ion secondary batteries will have a higher internal resistance.

For the above reasons, the present invention employs a production process in which raw coke or calcined coke having a high optical anisotropy of hexagonal reticulated plains randomly laminated is crushed, classified, and then carbonized and/or graphitized.

Accordingly, the production process of the present invention provides crushed raw coke or calcined coke with an organization of highly anisotropic regions. The present inventors have found that raw coke having such structure can be produced by delayed coking suitable for mass production by controlling the physical properties of the ingredient oil composition, and thus they have completed the present invention.

The ingredient oil composition having such physical properties can be obtained by blending two or more kinds of heavy oil and light oil so that the conditions described above are satisfied.

The heavy oil used in the production process of the present invention has an initial boiling point of 200° C. or higher, preferably 250° C. or higher. A preferred upper limit value thereof is 300° C. When the initial boiling point is lower than 200° C., the coke may have reduced yield in certain cases. The initial boiling point can be measured based on the method described in JIS (Japanese Industrial Standards) K 2254-6:1998.

The content of aromatic components in the heavy oil used in the production process of the present invention is 50% by mass or more, preferably 70% by mass or more. The preferred upper limit value is 90% by mass. If the content of aromatic components in the heavy oil falls in the above range, good bulk mesophase is formed, and raw coke prepared after coking, and calcined coke prepared by subsequent calcination will have high anisotropy. The sulfur content in the heavy oil used in the production process of the present invention is 0.5% by mass or less, preferably 0.4% by mass or less and more preferably 0.3% by mass or less. The preferred lower limit value is 0.1% by mass. If the sulfur content exceeds 0.5% by mass, the structure of the raw coke prepared after coking tends to have reduced anisotropy. The sulfur content can be measured based on the method described in JIS M 8813-appendance 2: 2006.

The nitrogen content in the heavy oil used in the production process of the present invention is 0.2% by mass or less, preferably 0.15% by mass or less and more preferably 0.10% by mass or less. The preferred lower limit value is 0.01% by mass. If the nitrogen content exceeds 0.2% by mass, the structure of the raw coke produced after coking tends to have reduced anisotropy. The nitrogen content can be measured based on the method described in JIS M 8813-appendance 4: 2006.

The heavy oil used in the production process of the present invention is not specifically restricted as long as a heavy oil whose initial boiling point, aromatics content, sulfur content and nitrogen content satisfy the conditions described above can be obtained by fluid catalytic cracking. It is preferably a hydrocarbon oil having a density of 0.8 g/cm$^3$ or more at 15° C. The density is measured based on the method described in JIS K 2249-1: 2011. The ingredient oil of the above heavy oil may be atmospheric distillation residual oils (long residues), vacuum distillation residual oils (short residues), shale oils, tar sand bitumens, Orinoco tars, coal liquefied oils, and heavy oils obtained by subjecting such oils to hydrogenation refinement, or the like. The ingredient oil of the above heavy oil may contain, in addition to the oils described above, relatively light oils such as direct distillate gas oil, vacuum gas oil, desulfurized gas oil, desulfurized vacuum gas oil, and the like, and it may contain preferably vacuum gas oil, such as desulfurized vacuum gas oil. The vacuum gas oil is preferably a desulfurized vacuum gas oil (preferably having a sulfur content of 500 mass ppm or less, with density at 15° C. being 0.8 g/cm$^3$ or higher) obtained by directly subjecting atmospheric distillation residue to desulfurization.

The light oil used in the present invention is preferably a gas oil having a high aromatics content. Such gas oil is typically a coker gas oil or the like. Such gas oil is highly aromatic and thus shows good mutual solubility with heavy oils. If the gas oil has a better mutual solubility, it is dispersed evenly in the heavy oil, whereby gas is uniformly generated, and the raw coke will have a better structural anisotropy.

Also, the process used for obtaining the above light oil is not specifically restricted. It includes, for example, delayed coking using an ingredient oil as a starting ingredient material, visbreaking (viscosity breaking), EUREKA process, HSC process, fluid catalytic cracking, and the like. The operation conditions are not specifically restricted, and the operation is carried out by means of a coker thermal cracking apparatus using the heavy oil described above as an ingredient material preferably at a reaction pressure of 0.8 MPa and a cracking temperature of 400 to 600° C.

The light oil used in the production process of the present invention has a distillation end point of 380° C. or lower, preferably 350° C. or lower. A preferred lower limit value is 310° C. When the distillation end point exceeds 380° C., a fraction subjected to coking is increased, and therefore raw coke produced after coking is reduced in an anisotropy. The distillation end point can be measured based on a method described in JIS K 2254-4: 1998. The content of the asphaltene component in the light oil used in the present invention is preferably less than 1% by mass, more preferably 0% by mass. Also, the distillation end point is 380° C. or lower, and thus a component which undergoes coking is substantially scarcely contained. If the component which is subjected to coking is present, the raw coke produced after coking may have reduced anisotropy, as discussed above.

The content of the aromatic components in the light oil used in the production process of the present invention is preferably 40% by volume or more, more preferably 50% by volume or more. The preferred upper limit value is 70% by volume. The percent by volume of the aromatic components referred to above is a volume percentage (% by volume) of the entire aromatics content based on the entire amount of coker gas oil which is measured according to Japan Petroleum Institute Standards JPI-5S-49-97 "Petroleum products—hydrocarbon type test method—high performance liquid chromatography" published by the Japan Petroleum Institute.

In the production process of the present invention, aromatic components having two or more aromatic rings is present with a content of preferably 20% by volume or more, more preferably 45% by volume or more. This is because, by having polycyclic aromatic rings including two aromatic rings, the raw coke produced after coking would have enhanced structural anisotropy.

An ingredient oil of the light oil used in the production process of the present invention is not specifically restricted as long as the light oil in which a distillation end point satisfies the conditions described above can be obtained by the process described above. The ingredient oil described above has a density of preferably 0.8 g/cm$^3$ or more at 15° C. Fluid catalytic cracking for obtaining the light oil is carried out usually on the same conditions as in the fluid catalytic cracking for obtaining the heavy oil described above.

The ingredient oil composition having the characteristics described above is subjected to coking, and raw coke is formed. Delayed coking is used as a method for subjecting the ingredient oil composition to coking. To be more specific, an ingredient oil composition is subjected to heat treatment by means of a delayed coker under a condition in which a coking pressure is controlled obtain raw coke. In the above case, the preferred operational conditions of the delayed coker are a pressure of 0.1 to 0.8 MPa and a temperature of 400 to 600° C.

The reason why a preferred range is set for the operation pressure of the delayed coker is that the release speed of gas generated from the gas oil component to the outside of the system can be controlled by pressure. The anisotropy constituting mesophase is controlled by the generated gas, and thus the retention time of the generated gas in the system is an important control parameter for determining the anisotropy described above. Also, the preferred range of the operation temperature of the delayed coker is for the purpose of causing mesophase to grow from the prepared ingredient oil so as to achieve the effects of the present invention.

The raw coke thus obtained or the calcined coke obtained by calcining the raw coke is crushed and classified so that particles having a prescribed size are obtained. The particle size is preferably 30 μm or less in terms of an average particle diameter. The average particle diameter is measured by means of a laser diffraction type particle size analyzer. The reason why the average particle diameter is 30 μm or less is that it is a particle size which is usually and suitably used for a negative electrode carbon material of a lithium ion secondary battery. Further, the preferred average particle diameter is 5 to 30 μm. The specific surface area of the graphite material having an average particle diameter of smaller than 5 μm is extremely large, and thus when a paste-like highly viscous fluid used for producing an electrode plate for the negative electrode is prepared by using such graphite material, a huge amount of solvent is required, so that it is not preferred.

The carbonization treatment is not specifically restricted and can include a method for carrying out heat treatment usually at a highest attained temperature of 900 to 1500° C. for a holding time of 0 to 10 hours at the highest attained temperature under an inert gas atmosphere of nitrogen, argon or helium. Also, if the carbonization step is omitted if necessary, it exerts a very small influence on the physical properties of the graphite material finally produced.

The graphitization treatment is not specifically restricted and can include a method for carrying out heat treatment usually at a highest attained temperature of 2500 to 3200° C. for a holding time of 0 to 100 hours at that highest attained temperature under inert gas atmosphere of nitrogen, argon or helium. Also, the crushed raw coke and/or the calcined coke are sealed tightly in a crucible and can be graphitized in a graphitization furnace such as an Acheson furnace and an LWG furnace.

The artificial graphite material of the present invention can be used as it is or in mixture with a natural graphite based material. As mixed with a natural graphite material, it shows excellent and specific effects such as improved life characteristics and reduced internal resistance of the lithium ion secondary battery. In this regard, the natural graphite based material includes naturally occurring graphite-like materials, materials obtained by highly purifying such graphite-like materials, materials obtained by spheroidizing subsequently such materials (including mechanochemical treatment), materials obtained by coating the surfaces of high purity products and spherical products with another carbons (for example, pitch-coated products, CVD-coated products and the like) or obtained by subjecting them to plasma treatment. The artificial graphite material used in the present invention may be squamous, scale-lie or spherical. The mixing ratio of the artificial graphite and the natural graphite is 5:95 to 80:20, preferably 10:90 to 40:60.

Next, the negative electrode of the lithium ion secondary battery will be explained. The production method of the negative electrode for the lithium ion secondary battery is not specifically restricted and includes, for example, a method in which a mixture (negative electrode mixture) containing the artificial graphite material of the present invention, a binder (bonding agent) and, if necessary, a conductive aid and an organic solvent is molded in a prescribed size by pressing. Further, the artificial graphite material of the present invention, a binder, a conductive aid and the like can be mixed in an organic solvent, and turned into a slurry, and then the slurry is coated on an electric collector such as a copper foil and the like and dried. The negative electrode mixture may be rolled and can be cut in a prescribed size.

The binder, or the bonding agent, includes polyvinylidene fluoride, polytetrafluoroethylene, polyacrylonitrile, polyethylene terephthalate, styrene-butadiene rubber (hereinafter referred to as SBR), and the like. The weight proportion of the binder contained in the negative electrode mixture is 1 to 30 parts by mass based on 100 parts by mass of the graphite material, and it may be suitably set, as necessary, in terms of a design of the battery.

The conductive aid includes carbon black, graphite, acetylene black, indium-tin oxide showing a conductivity, conductive polymers such as polyaniline, polythiophene, polyphenylenevinylene and the like. The amount of the conductive aid used is preferably 1 to 15 parts by mass based on 100 parts by mass of the graphite material.

The organic solvent includes dimethylforamide, N-metylpyrrolidone, pyrrolidone, N-metylthiopyrrolidone, hexamethylphosphamide, dimethylacetoamide, isopropanol, toluene, and the like.

The graphite material, the binder and, if necessary, the conductive aid and the organic solvent can be mixed using publicly known devices such as a screw type kneader, a ribbon mixer, a universal mixer, a planetary mixer, and the like. The mixture is molded by subjecting it to roll pressure and press pressure, and the pressure applied herein is preferably 100 to 300 MPa.

The material of the electric collector is not specifically restricted as long as it does not form an alloy with lithium. It includes, for example, copper, nickel, titanium, stainless steel and the like. Also, the form of the electric collector is not specifically restricted, and any ones can be used. It includes, for example, a foil form, a bored foil form, a band form provided with a mesh, and the like. Further, porous materials, for example, porous metals (foamed metals), and carbon papers can be used as well.

The method for coating the slurry describe above on the electric collector is not specifically restricted and includes, for example, publicly known methods such as metal mask printing, electrostatic coating, dip coating, spray coating, roll coating, doctor blading, gravure coating, screen printing, and die coating. After coating, rolling treatment is usually carried out, if necessary, by a plate press, a calendar roll or the like. Also, the slurry of the negative electrode material which is molded in a form of a sheet, a pellet and the like can be integrated with the electric collector, for example, by a publicly known method using a roll, a press or a combination thereof.

Next, the lithium ion secondary battery will be explained. The lithium ion secondary battery prepared using the graphite material for the negative electrode of the lithium ion secondary battery according to the present invention can be obtained, for example, by arranging a positive electrode and the negative electrode produced in the manner described above so that they are oppositely faced via a separator and injecting an electrolytic solution.

The active material used for the positive electrode is not specifically restricted, and metal compounds, metal oxides, metal sulfides which can be doped or subjected to reversible intercalation with lithium ions, or conductive polymers may be used. Capable of being given as the examples thereof are lithium cobalt oxide ($LiCoO_2$), lithium nickel oxide ($LiNiO_2$), lithium manganese oxide ($LiMn_2O_4$), lithium composite oxides ($LiCo_xNi_yM_zO_2$, x+y+z=1, M represents Mn, Al and the like) and oxides obtained by substituting a part of the above transition metals with other elements, lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, olivine type $LiMPO_4$ (wherein M represents any one of Co, Ni, Mn and Fe), conductive polymers of polyacetylene, polyaniline, polypyrrole, polythiophene, polyacetone or the like, porous carbons, and mixtures thereof.

In the present invention, the preferred active material for the positive electrode is iron base or manganese base compounds, and the more preferred active material is $LiMn_2O_4$ and $LiFePO_4$. The particularly preferred active material is materials obtained by mixing the above active materials with about 0.01 to 0.1 atom of Al based on one atom of Mn.

Using such positive electrode makes it possible to stably use a lithium ion battery up to the last stage of its life.

Capable of being used as the separator are, for example, unwoven cloths, cloths and microporous films prepared by using polyolefins such as polyethylene, polypropylene and the like as principal components, and combinations thereof. When the positive and negative electrodes of the lithium ion secondary battery prepared are not brought into direct contact, the separator is not required.

Publicly known organic electrolytic solutions, inorganic solid electrolytes and polymer solid electrolytes can be used as an electrolytic solution and an electrolyte for the lithium ion secondary battery. Organic electrolytic solutions are preferred from the viewpoint of electric conductivity.

For the organic electrolytic solution, the following organic solvents can be used: dibutyl ether, ethylene glycol monomethyl ether, ethylene glycol monoethyl ether, ethylene glycol monobutyl ether, diethylene glycol monomethyl ether, and ethylene glycol phenyl ether, amides such as N-methylformamide, N,N-dimethylformamide, N-ethylformamide, N,N-diethylformamide, N-methylacetamide, N,N-dimethylacetamide, N-ethylacetamide, and N,N-diethylacetamide, sulfur-containing compounds such as dimethyl sulfoxide, and sulfolane, dialkyl ketones such as methyl ethyl ketone and methyl isobutyl ketone, cyclic ethers such as tetrahydrofuran and 2-methoxytetrahydrofuran, cyclic carbonates such as ethylene carbonate, butylene carbonate, propylene carbonate, vinylene carbonate and the like, chain carbonates such as diethyl carbonate, dimethyl carbonate, methyl ethyl carbonate, and methyl propyl carbonate, cyclic carbonic esters such as γ-butyrolactone, γ-valerolactone and the like, chain carbonic esters such as methyl acetate, ethyl acetate, methyl propionate, and ethyl propionate, N-methyl-2-pyrrolidinone, acetonitrile, nitromethane, and the like. The above solvents can be used alone or in a mixture of two or more kinds thereof.

Various lithium salts can be used as a solute. Usually known lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, $LiN(C_2F_5SO_2)$, or the like.

The polymer solid electrolyte includes polyethylene oxide derivatives and polymers containing the above derivatives, polypropylene oxide derivatives and polymers containing the above derivatives, phosphoric ester polymers, polycarbonate derivatives and polymers containing the above derivatives, and the like. Nothing is restricted in selecting members necessary for constituting the battery in addition to the materials described above.

The structure of the lithium ion secondary battery is not specifically restricted, and it can normally be formed by inserting a wound electrode group obtained by spirally winding a positive electrode and a negative electrode each molded in a band form via a separator into a battery case and sealing the opening of the case, or by sealing a laminate type electrode plate group obtained by sequentially laminating a positive electrode and a negative electrode each molded in a plate form via a separator into an exterior body. The lithium ion secondary battery is used in the forms of, for example, paper type, button type, coin type, laminate type, cylinder type, rectangular type, or the like.

The lithium ion secondary battery prepared by using the graphite material of the present invention for a negative electrode material can have reduced internal resistance while maintaining high reliability (life characteristic of long term), and thus it can be used for industrial applications such as vehicles, to be specific, hybrid vehicles, plug-in hybrid vehicles and electric vehicles, and large-scale power supply systems.

EXAMPLES

The present invention will more specifically be explained below with reference to examples and comparative examples, but the present invention is by no means be restricted to the following examples.

1. Raw Coke and its Production Method:

Raw Coke A:

A desulfurized vacuum residue (sulfur content: 500 mass ppm, density at 15° C.: 0.88 g/cm$^3$) was subjected to fluid catalytic cracking to obtain a fluid catalytic cracking residue (hereinafter referred to as "fluid catalytic cracking residue (A)"). Fluid catalytic cracking residue (A) thus obtained had an initial boiling point of 220° C., a sulfur content of 0.2% by mass, a nitrogen content of 0.1% by mass, and an aromatic component of 60% by mass. Next, the desulfurized vacuum residue (sulfur content: 500 mass ppm, density at 15° C.: 0.88 g/cm$^3$) was subjected to fluid catalytic cracking to obtain a light cycle oil (hereinafter referred to as "fluid catalytic cracking gas oil (A)"). Fluid catalytic cracking gas oil (A) thus obtained had an initial boiling point of 180° C., a distillation end point of 350° C., an asphaltene component of 0% by mass, a saturate content of 47% by volume, and an aromatic component of 53% by volume. Also, an atmospheric distillation residue having a sulfur content of 3.5% by mass was subjected to hydrodesulfurization under the presence of a Ni—Mo catalyst so that a hydrocracking rate was 30% or less to obtain a hydrodesulfurization oil (hereinafter referred to as "hydrodesulfurization oil (A)"). An ingredient oil prepared by mixing the desulfurized vacuum residue (sulfur content: 500 mass ppm, density at 15° C.: 0.88 g/cm$^3$) with hydrodesulfurization oil (A) (sulfur content: 0.3% by mass, nitrogen content of 0.1% by mass, asphaltene component of 2% by mass, saturate content of 70% by volume, and density at 15° C.: 0.92 g/cm$^3$) with a mass ratio of 1:2 was subjected to fluid catalytic cracking to obtain a fluid catalytic cracking residue (hereinafter referred to as "fluid catalytic cracking residue (B)"). Fluid catalytic cracking residue (B) thus obtained had an initial boiling point of 220° C., a sulfur content of 0.5% by mass, a nitrogen content of 0.1% by mass, and an aromatic component of 78% by mass. Next, fluid catalytic cracking residue (A), fluid catalytic cracking residue (B) and fluid catalytic cracking gas oil (A) were mixed with a mass ratio of 5:2:3 to obtain an ingredient oil. This ingredient oil was introduced into a coke drum and subjected to heat treatment for coking at an atmospheric pressure and 500° C. for 3 hours.

Raw Coke B:

An ingredient oil obtained by mixing fluid catalytic cracking residue (A), the fluid catalytic cracking residue (B), hydrodesulfurization oil (A) and fluid catalytic cracking gas oil (A) with a mass ratio of 5:2:1.5:1.5 was used and subjected to coking as was case with raw coke A.

Raw Coke C:

An ingredient oil obtained by mixing a cracking gas oil obtained by a delayed coking process (sulfur content: 0.2% by mass, density at 15° C.: 0.92 g/cm$^3$, saturate content: 36% by volume, aromatic component: 64% by volume, asphaltene component: 0% by mass, initial boiling point: 220° C., and distillation end point: 340° C. (hereinafter referred to as "coker cracking gas oil (A)"), fluid catalytic cracking residue (A), fluid catalytic cracking residue (B), and hydrodesulfurization oil (A) respectively in a mass ratio of 5:5:2:1.5 was used and subjected to coking as was case with raw Coke A.

Raw Coke D:

An ingredient oil obtained by mixing coker cracking gas oil (A), fluid catalytic cracking residue (A) and fluid catalytic cracking residue (B) in a mass ratio of 3:5:2 was used and subjected to coking as was case with raw coke A.

Raw Coke E:

An ingredient oil obtained by mixing fluid catalytic cracking residue (A), fluid catalytic cracking residue (B) and hydrodesulfurization oil (A) in a mass ratio of 5.5:2:2.5 was used and subjected to coking as was case with raw coke A.

Raw Coke F:

An ingredient oil obtained by mixing a desulfurization gas oil obtained by a gas oil desulfurization apparatus (density at 15° C.: 0.83 g/cm$^3$, aromatic component: 25% by volume, asphaltene component: 0% by mass, initial boiling point: 170° C., and distillation end point: 370° C. (hereinafter referred to as "desulfurization gas oil (A)"), fluid catalytic cracking residue (A), and fluid catalytic cracking residue (B) with a mass ratio of 3:5:2 was used and subjected to coking as was case with raw coke A.

Raw Coke G:

An ingredient oil obtained by mixing fluid catalytic cracking residue (A), fluid catalytic cracking residue (B) and hydrodesulfurization oil (A) in a mass ratio of 7.5:2:0.5 was used and subjected to coking as was case with raw coke A.

Raw Coke H:

Fluid catalytic cracking residue (A) was used as an ingredient oil and subjected to coking as was case with raw coke A.

Raw Coke I:

Fluid catalytic cracking residue (B) was used as an ingredient oil and subjected to coking as was case with the raw coke A.

Raw Coke J:

The hydrodesulfurization oil (A) was used as an ingredient oil and subjected to coking as was case with raw coke A.

2. Production of Graphite Material:

Example 1

Raw coke A was crushed by means of a mechanical crusher (Super Rotor Mill, manufactured by Nisshin Engineering Inc.) and classified through a precision air classifier (Turbo Classifier, manufactured by Nisshin Engineering Inc.), whereby a powder of the raw coke having an average particle diameter of 12 μm was obtained. An average particle diameter of the raw coke was measured by means of a laser diffraction/dispersion particle size distribution measuring device LA 950 manufactured by HORIBA, Ltd. The above powder was put in a graphite crucible, and it was set in an induction heating type graphitization furnace and graphitized in nitrogen gas flow of 80 L/minute at a highest attained temperature of 2900° C. The powder was heated at a heating rate of 200° C./hour and held at the highest attained temperature for 3 hours, and it was cooled down to 1000° C. at a cooling rate of 100° C./hour and then left cooling down to room temperature in a state in which the nitrogen gas flow was maintained, whereby a graphite material was obtained.

Example 2

Raw coke B was crushed, classified and graphitized by the method described in Example 1 to obtain a graphite material.

Example 3

Raw coke C was crushed, classified and graphitized by the method described in Example 1 to obtain a graphite material.

Example 4

Raw coke D was crushed, classified and graphitized by the method described in Example 1 to obtain a graphite material.

Example 5

Raw coke D was crushed, classified and graphitized by the method described in Example 1 to obtain a powder of the raw coke. This powder was used as a material to be processed and carbonized at a highest attained temperature of 1200° C., a highest attained temperature-holding time of 5 hours under nitrogen gas flow by means of a roller hearth kiln manufactured by Takasogo Industry Co., Ltd. The carbon material thus obtained was put in a crucible and graphitized by the method described in Example 1 to thereby obtain a graphite material.

Example 6

Raw coke B was crushed and classified by the method described in Example 1 to obtain a powder of the raw coke. This powder was carbonized and graphitized by the method described in Example 5 to thereby obtain a graphite material.

Example 7

Raw coke A was crushed and classified by the method described in Example 1 to obtain a powder of the raw coke. This powder was carbonized and graphitized by the method described in Example 5 to thereby obtain a graphite material.

Example 8

A natural spherical graphite powder for a negative electrode material of a lithium ion secondary battery was mixed with the graphite material produced in Example 1 in a weight ratio of 50:50 to obtain a mixed material. The natural spherical graphite powder had an average particle diameter of 21 μm and a nitrogen adsorption specific surface area of 2.1 m²/g.

Example 9

The natural spherical graphite powder for a negative electrode material of a lithium ion secondary battery used in Example 8 was mixed with the graphite material produced in Example 1 in a weight ratio of 70:30 to obtain a mixed material.

Example 10

The natural spherical graphite powder for a negative electrode material of a lithium ion secondary battery used in Example 8 was mixed with the graphite material produced in Example 1 in a weight ratio of 85:15 to obtain a mixed material.

Comparative Example 1

The raw coke E was crushed, classified and graphitized by the method described in Example 1 to obtain a graphite material.

Comparative Example 2

The raw coke F was crushed, classified and graphitized by the method described in Example 1 to obtain a graphite material.

Comparative Example 3

Raw coke G was crushed, classified and graphitized by the method described in Example 1 to obtain a graphite material.

Comparative Example 4

Raw coke H was crushed, classified and graphitized by the method described in Example 1 to obtain a graphite material.

Comparative Example 5

Raw coke I was crushed, classified and graphitized by the method described in Example 1 to obtain a graphite material.

Comparative Example 6

Raw coke J was crushed, classified and graphitized by the method described in Example 1 to obtain a graphite material.

Comparative Example 7

The natural spherical graphite powder for a negative electrode material of a lithium ion secondary battery used in Example 8 was used as it was without being mixed with the other graphite materials.

3. Measurement and Calculation of Size L(112) of Crystallite of Graphite Material:

The graphite material obtained was mixed with 5% by mass of an Si standard sample as an internal standard, and the mixture was put in a glass-made sample holder (250 mmφ×0.22 mm t) and used to carry out measurement by a wide angle X ray diffraction method based on a method (*Tanso*, the Journal of the Carbon Society of Japan, 2006, No. 221, pp. 52-60) determined by Japan Society for the promotion of Science 117 Committee to calculate a size Lc (112) of a crystallite of the graphite material. ULTIMA IV manufactured by Rigaku Corporation was used for an X ray diffraction equipment. The measurement conditions were a Cu Kα beam (Kβ filter—Ni was used) for an X ray source and a voltage and a current of 40 kV and 40 mA each applied to an X ray tube. The diagram obtained was analyzed based on a method determined by Carbon Material 117 Committee of the Japan Society for the Promotion of Science (see *Tanso*, the Journal of the Carbon Society of Japan, 2006, No. 221, pp. 52-60). To be specific, the measured data were subjected to smoothing treatment and to absorption correction, polarization correction and Lorentz correction after removing a background, and a peak position of a (422)

diffraction line of the Si standard sample and the half band width were used to correct a (112) diffraction line of the graphite material to calculate the crystallite size. The crystallite size was calculated from the half band width of the corrected peak using the following Scherrer equation (4). The measurement and the analysis were carried out every three times for the same graphite material, and an average value thereof was set to L(112). The results obtained by measuring L(112) of the graphite material are shown in Table 1.

$$\text{Size of crystallite } D(A) = K \times \lambda / (\beta \times \cos\theta) \qquad (4)$$

K: Scherrer constant (form factor), A: wavelength of X ray tube used

β: expansion of diffraction line (half value width) by size of crystallite,

θ: diffraction angle 2θ/θ

4. Measurement of Raman Spectra

Raman spectroscopic analysis was carried out by using $Ar^+$ laser (excitation wavelength: 514.5 nm) for the light source. The measurement was carried out in the macro mode, wherein a spot diameter was about 100 μm, and it was set so that averaged information was obtained from the entire laser irradiation range. Ramanor T-64000 (Jobin Yvon/Atago Bussan) was used as the measuring device. The measuring arrangement was set at 60°, and the laser power was set to 10 mW. In the Raman spectral diagram obtained, the ratio (ID/IG) of intensity of a peak present in a wavelength range of $1360 \text{ cm}^{-1} \pm 100 \text{ cm}^{-1}$ to the intensity (IG) of peak present in a wavelength region of $1580 \text{ cm}^{-1} \pm 100 \text{ cm}^{-1}$ was calculated. The measurement and the analysis were carried out three times for the same graphite material, and an average value was determined as ID/IG. The ID/IG values of the graphite materials obtained in the examples and the comparative examples were calculated, and the results are shown in Table 1.

5. Measurement of ESR:

A sample tube was charged with 1.5 mg of the graphite material and evacuated by means of a rotary pump, and then it was charged with He gas and subjected to ESR measurement. ESP350E manufactured by Bruker Corporation, HP5351P manufactured by Hewlett-Packard Company, ER035M manufactured by Bruker Corporation, and ESR910 manufactured by Oxford Instruments plc were used respectively for an ESR apparatus, a microwave frequency counter, a gauss meter and a cryostat. The X band (9.47 GHz) was used as a microwave to carry out measurement on the conditions of an intensity of 1 mW, a central magnetic field of 3360 G and a magnetic field modulation of 100 kHz. The ESR measurement was carried out at two measurement temperatures of 4.8 K and 280 K. Shown in Table 1 are results obtained by calculating a relative absorption intensity ratio (I4.8 K/I280 K) of an absorption intensity (I4.8 K) of the spectrum measured at a temperature of 4.8 K to an absorption intensity (I280 K) of the spectrum measured at a temperature of 280 K in the graphite materials obtained in the examples and the comparative examples. The signal intensity is a value determined by integrating twice the ESR spectrum. It was confirmed that a spectrum originating from carbon which appears in electron spin resonance measured using the X band appeared in a range of 3200 to 3400 gauss (G) in all of the examples and the comparative examples.

6. Preparation of Battery:

A cross section of the battery prepared is shown in FIG. 1. The battery 10 is constituted from the negative electrode 11, the negative electrode electric collector 12, the positive electrode 13, the positive electrode electric collector 14, the separator 15 and the aluminum-laminated exterior body 16. The positive electrode 13 is a sheet electrode prepared by mixing lithium cobalt oxide $LiCoO_2$ (Cellseed C-10N manufactured by Nippon Chemical Industrial Co., Ltd.) having an average particle diameter of 10 μm which was a positive electrode material, polyvinylidene fluoride (KF #1320 manufactured by Kureha Corporation) which was a binder, and acetylene black (Denka Black manufactured by Denka Company Limited) in a mass ratio of 89:6:5, adding N-methyl-2-pyrrolidinone thereto and kneading the mixture to prepare a paste, coating the paste on one side of an aluminum foil having a thickness of 30 μm, drying and rolling the coated paste, and cutting the foil so that a size of the coated part was provided with a width of 30 mm and a length of 50 mm. In this regard, the coating amount thereof per unit area was set to 20 $mg/cm^2$ in terms of a mass of lithium cobalt oxide. The positive electrode mixture was scraped off at a part of the above sheet electrode vertically to a longitudinal direction of the sheet, and the exposed aluminum foil was connected integrally with the positive electrode electric collector 14 (aluminum foil) of the coated part and played a role of a positive electrode lead plate. The negative electrode 11 is a sheet electrode prepared by mixing one of the graphite materials obtained in Examples 1 to 7 and Comparative Examples 1 to 6 which was a negative electrode material and polyvinylidene fluoride (KF #9310 manufactured by Kureha Corporation) which was a binder in a mass ratio of 92:8, adding N-methyl-2-pyrrolidinone thereto and kneading the mixture to prepare a paste, coating the paste on one side of a copper foil having a thickness of 18 μm, drying and rolling the coated paste, and cutting the foil so that a size of the coated part was provided with a width of 32 mm and a length of 52 mm. In this regard, the coating amount per unit area was set to 10 $mg/cm^2$ in terms of the mass of the graphite material. The negative electrode mixture was scraped off at a part of the above sheet electrode vertically to a longitudinal direction of the sheet, and the exposed copper foil was connected integrally with the negative electrode electric collector 12 (copper foil) of the coated part and played a role of a negative electrode lead plate. The battery 10 is prepared by sufficiently drying the positive electrode 13, the negative electrode 11, the separator 15 and the other parts, introducing them into a glove box filled with an argon gas having a dew point of −100° C. to use them for assembly. The drying conditions are 150° C. for 12 hours or longer in a vacuum state for the positive electrode 13 and the negative electrode 11, and 70° C. for 12 hours or longer in a vacuum state for the separator 15 and the other parts. The positive electrode 13 and the negative electrode 11 which were dried in the manner described above were laminated in a state in which the coated part of the positive electrode 13 and the coated part of the negative electrode 11 were oppositely faced via a cellulose base unwoven fabric (TF40-50 manufactured by Nippon Kodoshi Corporation) and fixed by a polyimide tape. In respect to a laminate position relation of the positive electrode 13 and the negative electrode 11, the positive electrode 13 and the negative electrode 11 were oppositely faced so that a peripheral part of the positive electrode 13 was projected in an inside of the coated part of the negative electrode 11. The single layer electrode body thus obtained was embedded by an aluminum laminate film, and an electrolytic solution was injected thereinto. The laminate film was thermally fused in a state in which the positive electrode lead plate and the negative electrode lead plate described above protruded, whereby a sealed type single layer laminate battery was prepared. The electrolytic solution used was prepared by dissolving lithium hexafluorophosphate (LiPF$_6$) in a solvent obtained by mixing ethylene carbonate and ethyl methyl carbonate in terms of a volume ratio of 3:7 so that a concentration of 1 mol/L was obtained.

7. Testing Battery:

The battery thus obtained was set in a thermostatic chamber of 25° C. to carry out a charge and discharge test shown below. First, the battery was charged at a constant electric current of 4 mA until the voltage of the battery reached 4.2 V. After a rest for 10 minutes, the battery was discharged at the same constant electric current until the voltage of the battery reached 3.0 V. These charging, rest and discharging were set to one charge and discharge cycle, and the charge and discharge cycle was repeated three times. This charge and discharge cycle is a preliminary test for detecting an abnormal state, and therefore it is not included in a cycle number of a charge and discharge cycle test in the examples and the comparative examples. It was confirmed that all the batteries prepared t in the examples and the comparative examples were free from abnormality. After that, the following principal test was carried out. Fixed current/fixed voltage charging was carried out as a principal test at a charging current of 30 mA and a charging voltage of 4.2 V for a charging time of 3 hours, and after a rest for 10 minutes, the battery was discharged at the same constant electric current (30 mA) until the voltage of the battery reached 3.0 V. These charging, rest and discharging were set to one charge and discharge cycle, and the charge and discharge cycle was repeated three times, wherein the discharge capacity in the third cycle was set to "an initial discharge capacity". Next, fixed current/fixed voltage charging was carried out t at a charging current of 30 mA and a charging voltage of 4.2 V for a charging time of 3 hours, and after a rest for 10 minutes, the battery was discharged at a constant electric current of 75 mA until the voltage of the battery reached 3.0 V. In this respect, the direct current resistance (Rdc) of the laminate packaged battery was calculated from an open circuit voltage (OCV) after a rest for 10 minutes, the closed circuit voltage (CCV) after 3 seconds since starting discharging, and the discharging current (I) after 3 seconds since starting discharging. The calculation equation is Rdc=(OCV−CCV)/I. Then, 500 cycles of charging and discharging were repeated by the charging and discharging cycle on the same conditions as in the charging and discharging cycle for determining the initial discharge capacity. A ratio (%) of "a discharge capacity in the 500th cycle" to "the initial discharge capacity" was calculated as an index representing a cycle characteristic to set it to a discharge capacity maintenance rate (%). The initial discharge capacity (mAh), the direct current resistance (Rdc) ($\Omega$), the discharge capacity (mAh) in the 500th cycle and the discharge capacity maintenance rate (%) in the 500th cycle are shown in Table 1.

TABLE 1

| | Size of crystallite L(112) (nm) | Peak intensity ratio (ID/IG) of Raman spectra | Absorption intensity ratio (I4.8 K/I289 K) of ESR | Direct current resistance (Rdc) of laminate battery ($\Omega$) | Initial capacity of laminate battery (mAh) | Capacity of laminate battery after 500 cycles (mAh) | Capacity maintenance rate of laminate battery after 500 cycles (%) |
|---|---|---|---|---|---|---|---|
| Example 1 | 14 | 0.127 | 10.8 | 1.55 | 42.1 | 37.9 | 90.0 |
| Example 2 | 8 | 0.181 | 8.5 | 1.58 | 42.2 | 37.6 | 89.1 |
| Example 3 | 5 | 0.200 | 12.0 | 1.51 | 42.3 | 37.2 | 87.9 |
| Example 4 | 13 | 0.193 | 5.2 | 1.68 | 42.2 | 37.6 | 89.1 |
| Example 5 | 22 | 0.065 | 8.2 | 1.75 | 42.3 | 38.5 | 91.0 |
| Example 6 | 18 | 0.094 | 6.8 | 1.83 | 42.3 | 38.5 | 91.0 |
| Example 7 | 25 | 0.050 | 5.0 | 1.89 | 42.1 | 38.7 | 91.9 |
| Example 8 | * | * | * | 1.59 | 42.6 | 37.9 | 89.0 |
| Example 9 | * | * | * | 1.67 | 42.2 | 37.2 | 88.2 |
| Example 10 | * | * | * | 1.75 | 42.5 | 37.0 | 87.1 |
| Comparative Example 1 | 25 | 0.033 | 3.1 | 2.74 | 42.1 | 39.2 | 93.1 |
| Comparative Example 2 | 20 | 0.118 | 4.2 | 2.53 | 42.3 | 38.5 | 91.0 |
| Comparative Example 3 | 11 | 0.272 | 2.9 | 2.32 | 42.2 | 34.6 | 82.0 |
| Comparative Example 4 | 9 | 0.139 | 14.1 | 1.46 | 42.1 | 34.1 | 81.0 |
| Comparative Example 5 | 6 | 0.224 | 9.8 | 1.56 | 42.2 | 35.0 | 82.9 |
| Comparative Example 6 | 5 | 0.247 | 13.3 | 1.41 | 42.3 | 33.8 | 79.9 |
| Comparative Example 7 | 30 | 0.167 | 4.2 | 2.41 | 42.1 | 31.6 | 75.1 |

* size of crystallite, intensity ratio of Raman spectra and absorption intensity ratio of ESR were not measured due to mixture 8. Consideration on Test Results:

It can be judged that the batteries prepared by using the graphite materials obtained in Examples 1 to 7 and Comparative Examples 1 to 6 for the negative electrode have an equal initial discharge capacity and no significant differences are not observed among them. It has been found that because a size L(112) of crystallite of the graphite materials obtained in Examples 1 to 7 and Comparative Examples 1 to 6 is 5 to 25 nm, differences in working capacity are not observed depending on the size of crystallite of the negative electrode within the designed range of the present battery. It has been found that because the batteries prepared using the graphite materials obtained in Examples 1 to 7 have a direct current resistance of 1.51 to 1.89$\Omega$ and a discharge capacity maintenance rate of 87.9 to 91.9% after 500 cycles, use of the graphite materials according to the present invention makes it possible to reduce the internal resistance while maintaining a high discharge capacity maintenance rate, or a long term life characteristic (high reliability), as compared with the results of Comparative Examples 1 to 6.

On the other hand, it has been found that the graphite material obtained in Comparative Example 1 is lower in both the intensity ratio (ID/IG) of Raman spectra and the absorption intensity ratio (I4.8 K/I280 K) of ESR than the graphite materials obtained in Examples 1 to 7. The battery prepared using the graphite material obtained in Comparative Example 1 could secure a cycle characteristic equal to those of the batteries prepared by using the graphite materials obtained in Examples 1 to 7, but it showed a higher internal resistance.

It has been found that the graphite material obtained in Comparative Example 2 is equal in the intensity ratio (ID/IG) of Raman spectra to but is lower in the absorption intensity ratio (I4.8 K/I280 K) of ESR than the graphite materials obtained in Examples 1 to 7. The battery prepared using the graphite material obtained in Comparative Example 2 could, as is the case with in Comparative Example 1, secure a cycle characteristic equal to those of the batteries prepared using the graphite materials obtained in Examples 1 to 7, but it showed a higher internal resistance.

It has been found that the graphite material obtained in Comparative Example 3 showed a higher value of the intensity ratio (ID/IG) of Raman spectra and a lower value of the absorption intensity ratio (I4.8 K/I280 K) of ESR than the graphite materials obtained in Examples 1 to 7. The battery prepared using the graphite material obtained in Comparative Example 3 showed a lower capacity maintenance rate after 500 cycles and a higher internal resistance, as compared with the batteries prepared by using the graphite materials obtained in Examples 1 to 7 for a negative electrode.

It has been found that the graphite material obtained in Comparative Example 4 is equal in the intensity ratio (ID/IG) of Raman spectra to but is higher in the absorption intensity ratio (I4.8 K/I280 K) of ESR than the graphite materials obtained in Examples 1 to 7. The battery prepared using the graphite material obtained in Comparative Example 4 showed a low internal resistance equal to the batteries prepared using the graphite materials obtained in Examples 1 to 7, but it showed a lower capacity maintenance rate after 500 cycles.

It has been found that the graphite material obtained in Comparative Example 5 is equal in the absorption intensity ratio (I4.8 K/I280 K) of ESR, but it is higher in the intensity ratio (ID/IG) of Raman spectra than the graphite materials obtained in Examples 1 to 7. The battery prepared using the graphite material obtained in Comparative Example 5 showed, as is the case with in Comparative Example 4, a low internal resistance equal to the batteries prepared using the graphite materials obtained in Examples 1 to 7, but it showed a lower capacity maintenance rate after 500 cycles.

It has been found that the graphite material obtained in Comparative Example 6 is high in the intensity ratio (ID/IG) of Raman spectra and high as well in the absorption intensity ratio (I4.8 K/I280 K) of ESR, as compared with the graphite materials obtained in Examples 1 to 7. The battery prepared using the graphite material obtained in Comparative Example 6 showed, as is the case with in Comparative Examples 4 and 5, a low internal resistance equal to the batteries prepared by using the graphite materials obtained in Examples 1 to 7, but it showed a lower capacity maintenance rate after 500 cycles.

Examples 8 to 10 are cases in which a mixture of a natural spherical graphite normally used for lithium ion secondary batteries and the graphite material produced in Example 1 was used, and a mixing ratio thereof was changed in the respective examples. In contrast with this, Comparative Example 7 is a case in which the above natural spherical graphite was used alone. It has been found that as apparent from the comparisons of the characteristics of the laminate batteries prepared by using the graphite materials obtained in Examples 8 to 10 and Comparative Example 7, mixing the natural spherical graphite with the artificial graphite powders according to the present invention makes it possible to reduce a direct current resistance of the laminate battery and improve a capacity maintenance rate thereof after 500 cycles. It has been found as well that even when the artificial graphite according to the present invention is mixed with other graphite materials, the effects of the present invention are obtained.

It is obvious from the above results that the followings are essential conditions for obtaining a lithium ion secondary battery which has an internal resistance as low as 1.9Ω or less and which achieves a high discharge capacity maintenance rate of 87% or more after 500 cycles: (a) in Raman spectral analysis using argon ion laser beam having a wavelength of 5145 angstrom, the ratio (ID/IG) of the intensity (ID) of peak present in a wavelength region of 1360 cm$^{-1}$±100 cm$^{-1}$ to the intensity (IG) of peak present in a wavelength region of 1580 cm$^{-1}$±100 cm$^{-1}$ is 0.05 to 0.2; and (b) absorption spectra originating from carbon which appears in a range of 3200 to 3400 gauss (G) is included in an electron spin resonance spectroscopy measured by using the X band, and the relative absorption intensity ratio (I4.8 K/I280 K) of the absorption intensity (I4.8 K) measured at a temperature of 4.8 K to the absorption intensity (I280 K) measured at a temperature of 280 K in the above spectra is 5.0 to 12.0.

Also, from the above results, it turned out to be essential for obtaining a lithium ion secondary battery which has an internal resistance as low as 1.9 Ω or less and which achieves a high discharge capacity maintenance rate of 87% or more after 500 cycles to use a production process comprising at least: a coking step in which an ingredient oil composition containing at least a gas oil having a distillation end point of 380° C. or lower and a heavy oil having an initial boiling point of 200° C. or higher, an aromatic component of 50% by mass or more, a sulfur content of 0.5% by mass or less and a nitrogen content of 0.2% by mass or less is subjected to coking treatment by delayed coking; and a heat treatment step in which the composition is subjected to heat treatment after the coking step.

INDUSTRIAL APPLICABILITY

The lithium ion secondary battery prepared using the graphite material according to the present invention as a negative electrode material can have a reduced internal resistance while maintaining high reliability, as compared with lithium ion secondary batteries prepared by using conventional graphite materials. Accordingly, it can be used for industrial applications such as vehicles, to be specific, hybrid vehicles, plug-in hybrid vehicles, and electric cars, and large-scale power supply system.

DESCRIPTION OF SYMBOLS

10 Battery
11 Negative electrode
12 Negative electrode electric collector
13 Positive electrode
14 Positive electrode electric collector
15 Separator
16 Aluminum laminate exterior

The invention claimed is:

1. An artificial graphite material for a negative electrode of a lithium ion secondary battery, wherein a size L(112) of a crystallite in a c-axis direction which is calculated from a (112) diffraction line measured by powder X-ray diffraction is 5 to 25 nm; in Raman spectral analysis using argon ion laser beam having a wavelength of 5145 angstrom, a ratio (ID/IG) of an intensity (ID) of peak present in a wavelength region of 1360 cm$^{-1}$±100 cm$^{-1}$ to an intensity (IG) of peak present in a wavelength region of 1580 cm$^{-1}$±100 cm$^{-1}$ is 0.05 to 0.2; an absorption spectra originating from carbon which appears in a range of 3200 to 3400 gauss (G) is found in electron spin resonance spectroscopy measured using X band, and a relative absorption intensity ratio (I4.8 K/I280 K) of absorption intensity (I4.8 K) measured at a temperature of 4.8 K to absorption intensity (I280 K) measured at a temperature of 280 K in the above absorption spectra is 5.0 to 12.0.

2. A method for producing the artificial graphite material for a negative electrode of a lithium ion secondary battery according to claim 1, comprising at least:
   a coking step in which an ingredient oil composition containing at least light oil having a distillation end point of 380° C. or lower, and heavy oil having an initial boiling point of 200° C. or higher, an aromatic component of 50% by mass or more, a sulfur content of 0.5% by mass or less, and a nitrogen content of 0.2% by mass or less is subjected to coking treatment by delayed coking, and
   a heat treatment step in which the composition is subjected to heat treatment after the coking step.

3. A negative electrode for a lithium ion secondary battery containing at least the graphite material according to claim 1.

4. A lithium ion secondary battery prepared by using the negative electrode according to claim 3.

* * * * *